US009280881B2

(12) United States Patent
Lee

(10) Patent No.: US 9,280,881 B2
(45) Date of Patent: Mar. 8, 2016

(54) CASSETTE DETECTING DEVICE AND MEDIUM PROCESSING DEVICE USING THE SAME

(71) Applicant: LG N-SYS INC., Seoul (KR)

(72) Inventor: HyoWook Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 404 days.

(21) Appl. No.: 13/652,745

(22) Filed: Oct. 16, 2012

(65) Prior Publication Data

US 2013/0093442 A1 Apr. 18, 2013

(30) Foreign Application Priority Data

Oct. 17, 2011 (KR) ........................ 10-2011-0105986

(51) Int. Cl.
*G01N 27/04* (2006.01)
*G07G 1/00* (2006.01)

(52) U.S. Cl.
CPC .................................... *G07G 1/0027* (2013.01)

(58) Field of Classification Search
CPC . G07G 1/0027; G01N 27/04; G07D 11/0003; G07D 11/0009; G07D 11/0012; G07D 11/0036; G07D 11/0048; G07F 9/06; G07F 19/20; G07F 19/205; G07F 19/209
USPC ........... 324/693; 271/162, 164, 145; 235/379, 235/380
See application file for complete search history.

(56) References Cited

U.S. PATENT DOCUMENTS 5,561,281 A * 10/1996 Eda et al. ...................... 235/379
6,557,757 B1 * 5/2003 Peebles ............. G07D 11/0012 235/379
8,181,857 B1 * 5/2012 Lute et al. ..................... 235/379
2001/0011659 A1 * 8/2001 Izawa et al. ................... 221/200
2003/0047568 A1 * 3/2003 Ko et al. ....................... 221/197
2003/0071048 A1 * 4/2003 Black ................. G07D 11/0009 221/2
2004/0205024 A1 * 10/2004 Washington et al. ........... 705/43
2007/0013124 A1 * 1/2007 Graef ....................... B65H 1/26 271/145
2007/0205259 A1 * 9/2007 Tocher et al. ................ 235/379

(Continued)

FOREIGN PATENT DOCUMENTS

CN 102193473 A 9/2011
JP 2004-184781 A 7/2004

(Continued)

OTHER PUBLICATIONS

Notice of Allowance dated Apr. 22, 2013 in Korean Application No. 10-2011-0105986, filed Oct. 17, 2011.

(Continued)

*Primary Examiner* — Tung X Nguyen
*Assistant Examiner* — David Frederiksen
(74) *Attorney, Agent, or Firm* — Saliwanchik, Lloyd & Eisenschenk

(57) ABSTRACT

A cassette detecting device and a medium processing device using the same are provided. The cassette detecting device comprises: a main board comprising a first input unit and detecting and outputting at least one of whether at least one cassette connected to the first input unit is mounted and its mounting position; and a plurality of cassettes storing a medium, comprising a second input unit connected to the main board, and determining the mounting position of a corresponding cassette according to a signal from the second input unit, each of the plurality of cassettes and the main board comprises a comparing unit for determining the mounting position of a cassette.

8 Claims, 2 Drawing Sheets

(56) References Cited

U.S. PATENT DOCUMENTS

| | | | | |
|---|---|---|---|---|
| 2011/0029266 | A1* | 2/2011 | Lee | 702/64 |
| 2011/0074096 | A1* | 3/2011 | Staff et al. | 271/164 |
| 2011/0085806 | A1 | 4/2011 | Matsuda | |

FOREIGN PATENT DOCUMENTS

| | | | |
|---|---|---|---|
| JP | 2005-004537 | A | 1/2005 |
| JP | 2006-315780 | A | 11/2006 |
| KR | 10-2001-0056395 | A | 7/2001 |
| KR | 10-2007-0033850 | A | 3/2007 |
| KR | 10-2007-0037924 | A | 4/2007 |
| KR | 10-2007-0066412 | A | 6/2007 |
| KR | 2011-0012911 | A | 2/2011 |
| KR | 10-2011-0074371 | A | 6/2011 |
| KR | 10-1074542 | B1 | 10/2011 |
| KR | 10-1093841 | B1 | 12/2011 |

OTHER PUBLICATIONS

Office Action dated Apr. 22, 2013 in Korean Application No. 10-2012-0027418.

Office Action dated Nov. 26, 2014 in Chinese Application No. 201210393874.9.

* cited by examiner

CASSETTE DETECTING DEVICE AND MEDIUM PROCESSING DEVICE USING THE SAME

CROSS-REFERENCE TO RELATED APPLICATION

This application claims the benefit under 35 U.S.C. §119 of Korean Patent Application No. 10-2011-0105986, filed Oct. 17, 2011, which is hereby incorporated by reference in its entirety.

BACKGROUND

The present invention relates to a cassette detecting device and a medium processing device using the same, and more particularly, to a cassette detecting device for simply detecting whether a cassette is mounted and its mounting position by using a plurality of output signals from a plurality of comparators corresponding to a plurality of cassettes on a main board recognizing them and also from the plurality of cassettes, and a medium processing device.

The term "medium" used in this specification, for example, comprises bills, checks, tickets, and certificates, and also may comprise arbitrary various objects having a thinner thickness than the width or length. In this specification, for convenience of description, bills are exemplified as one of various media.

The medium processing device obtains a medium or store it, or releasing the stored medium, and thus, store media having different sizes or thicknesses in a plurality of cassettes. For example, when four cassettes are mounted on the medium processing device, each cassette may store different denominations of bills, and may be connected to a main board through a connector. Also, the main board may detect whether each cassette is mounted on the basis of each connector is connected.

Moreover, in order to connect the cassette with the main board, a cable and a connector are used. As the number of cassettes is increased, cables become complex.

BRIEF SUMMARY

Embodiments provide a cassette detecting device available for easy fabrication processes and having a simple circuit configuration and a medium processing device using the same.

In one embodiment, a cassette detecting device comprises: a main board comprising a first input unit and detecting and outputting at least one of whether at least one cassette connected to the first input unit is mounted and its mounting position; and a plurality of cassettes storing a medium, comprising a second input unit connected to the main board, and determining the mounting position of a corresponding cassette according to a signal from the second input unit, each of the plurality of cassettes and the main board comprises a comparing unit for determining the mounting position of a cassette.

In another embodiment, a cassette detecting device comprises: a main board; and a plurality of cassettes connected to the main board through a connector, wherein the main board comprises: a first input unit connected to the connector; and a first comparing unit having one end connected to the first input unit and the other end connected to a first voltage, the cassette comprises: a second input unit connected to the connector; and a second comparing unit having one end connected to the second input unit and the other end connected to a second voltage, the comparing unit comprises a plurality of first comparators, among the plurality of first comparators, a third voltage is applied to one end of a first comparator corresponding to the position where the cassette is mounted, a supply voltage is applied to one end of a first comparator corresponding to the position where the cassette is not mounted, and the main board determines whether the cassette is mounted and its mounting position by comparing outputs of the plurality of first comparators.

In further another embodiment, a medium processing device comprises: a main board; a plurality of cassettes connected to the main board and storing a medium, wherein the main board comprises: a first input unit; and a first comparing unit connected to the first input unit and comprising a plurality of first comparators corresponding to the plurality of cassettes, each of the plurality of cassettes comprises: a second input unit connected to the first input unit; and a second comparing unit connected to the second input unit and comprising a plurality of comparators corresponding to the plurality of cassettes, and each of the plurality of cassettes determines its mounting position by comparing outputs of the plurality of second comparators.

The details of one or more embodiments are set forth in the accompanying drawings and the description below. Other features will be apparent from the description and drawings, and from the claims.

DETAILED DESCRIPTION

Figure 1:
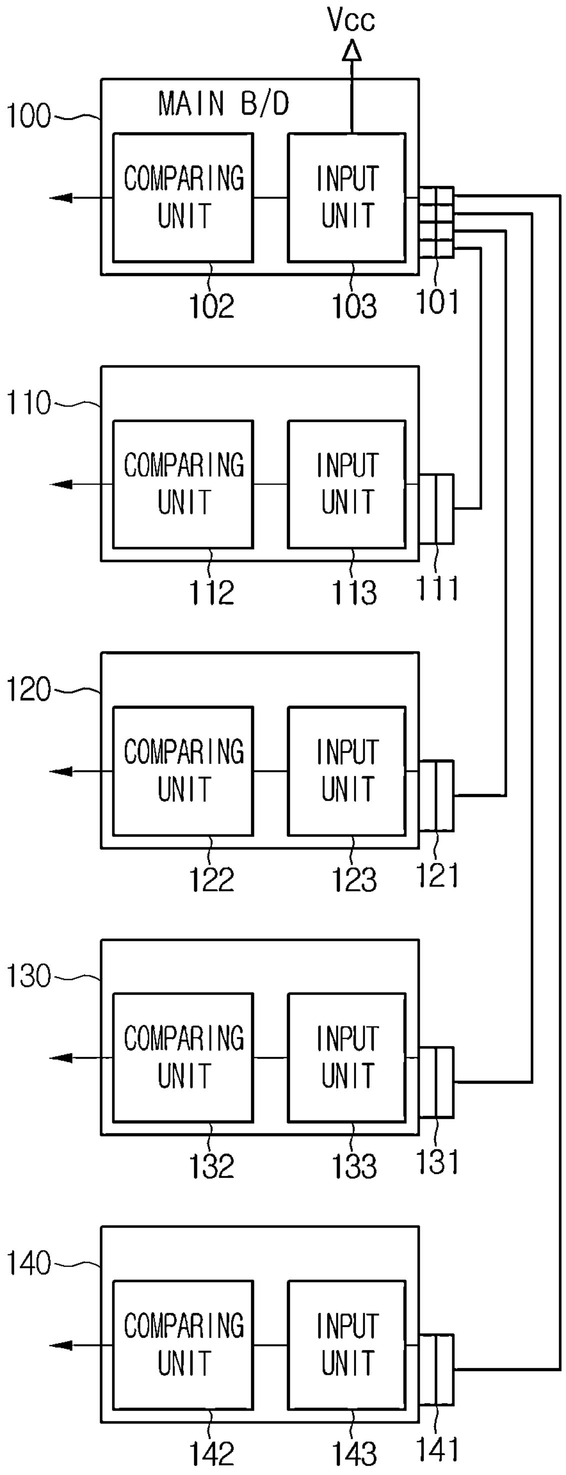
FIG. 1 is a block diagram illustrating a configuration of a cassette detecting device according to an embodiment of the present invention.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a block diagram illustrating a configuration of a cassette detecting device according to an embodiment of the present invention.

Referring to FIG. 1, the cassette detecting device may be comprised as one element of a medium processing device. In this specification, the cassette detecting device will be mainly described.

The cassette detecting device may comprise a main board for detecting whether at least one cassette is mounted and its mounting position and outputting them and a plurality of cassettes 110, 120, 130, and 140 having second input units 113, 123, 133, and 143 connected to the main board 100 and having media.

The plurality of cassettes 110, 120, 130, and 140 may determine their positions according to the signals from the second input units 113, 123, 133, and 143, which are generated in response to external signals. The external signal may be a supply voltage Vcc applied to the first input unit 103 connected to the second input units 113, 123, 133, and 143, but is not limited thereto.

The main board 100 may comprise a connector 101 to connect to the plurality of cassettes 110, 120, 130, and 140. The connector 101 may comprise a plurality of pins respectively corresponding to a plurality of cassettes. The plurality of pins may be connected to the plurality of cassettes 110, 120, 130, and 140, respectively, through a cable.

The main board 100 may comprise a first input unit 103 connected to the connector 101 to deliver a signal. According to the signal outputted from the first input unit 103, the first comparator 102 of the main board 100 may determine whether each of a plurality of cassettes is mounted and its mounting position.

A plurality of cassettes may comprise second comparing units 112, 122, 132, and 142, respectively, in order to determine where each is mounted. For example, a medium processing device according to an embodiment of the present invention may comprise a plurality of trays (not shown) where cassettes are mounted. Here, each of a plurality of trays may have a unique number, and a plurality of cassettes mounted on the trays may determine which number tray each cassette is mounted through the second comparing units 112, 122, 132, and 142. For example, a cassette mounted on a first tray may determine that the cassette itself is mounted on the first tray. A cassette mounted on a second tray may determine that the cassette itself is mounted on the second tray Here, the number of trays may be four, but is not limited thereto.

Accordingly, each of the main board 100 and the plurality of cassettes 110, 120, 130, and 140 may operate to know each other the position of the mounted cassette. Accordingly, as shown in FIG. 1, the cassette detecting device may operate by only connecting the main board 100 with cassettes through, for example, four cables (i.e. the number of cassettes). A detailed circuit diagram and operations for detecting a cassette will be described below with reference to FIG. 2.

Figure 2:
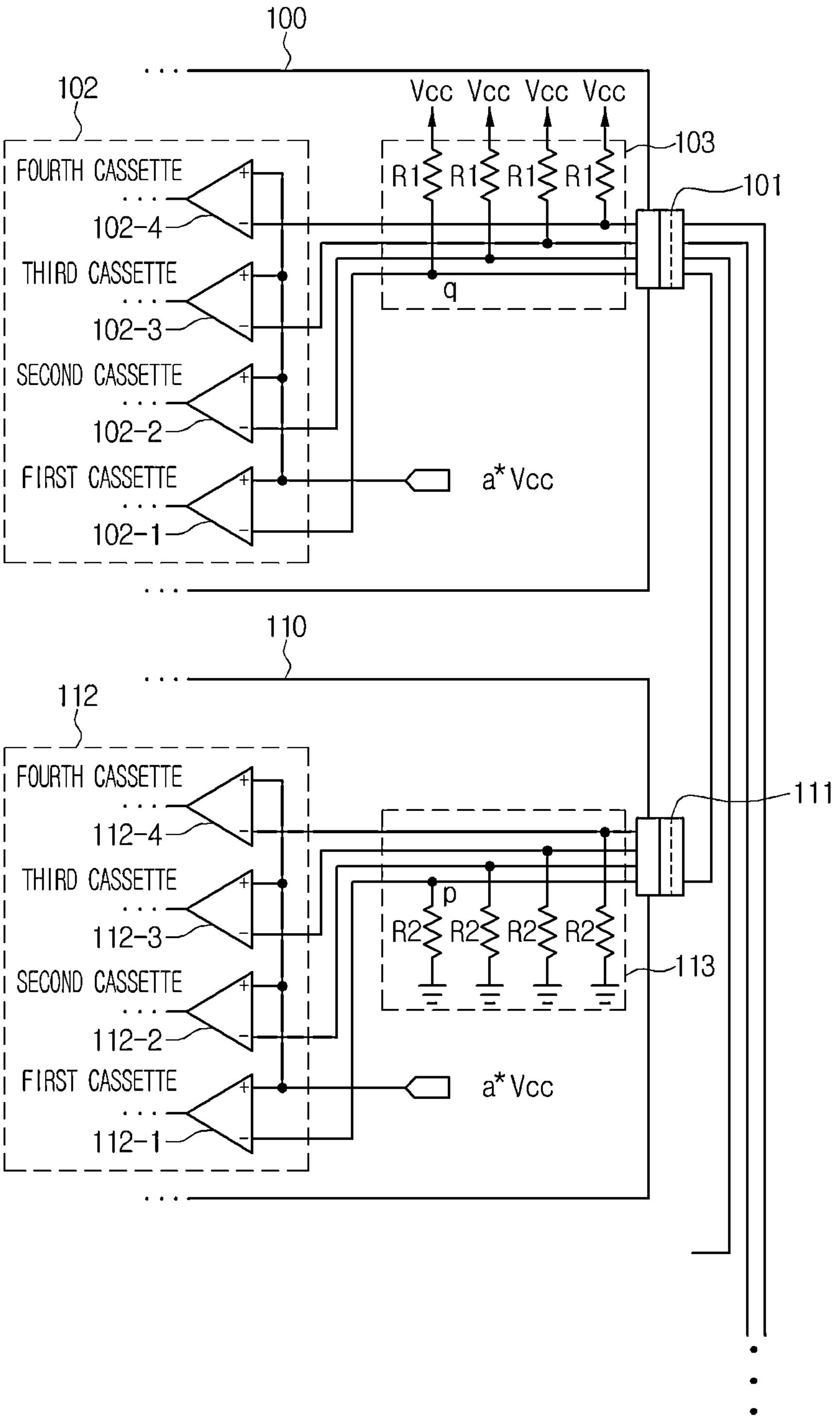
FIG. 2 is a circuit diagram illustrating a part of a cassette detecting device according to an embodiment of the present invention.

FIG. 2 is a circuit diagram illustrating a part of a cassette detecting device according to an embodiment of the present invention. Referring to FIG. 2, only a main board 100 and one 110 among a plurality of cassettes according to an embodiment of the present invention will be described.

Referring to FIG. 2, the main board 100 may comprise a first input unit 103 and a first comparing unit 102. The first input unit 103 receives a signal inputted from a plurality of cassettes through a connector 103 when supply voltage is applied and then delivering the received signal to a first comparing unit 102. The first comparing unit 102 comprises a plurality of first comparators 102-1, 102-2, 102-3, and 102-4 corresponding to the number of cassettes.

The first comparing unit 102 may comprise a plurality of first comparators 102-1, 102-2, 102-3, and 102-4. The number of the first comparators 102-1, 102-2, 102-3, and 102-4 is identical to the maximum number of cassettes to be mounted.

A first voltage (a*Vcc) may be applied to the one end (+) of the first comparators 102-1, 102-2, 102-3, and 102-4. A signal inputted from the first input unit 103 may be commonly applied to the other end (1) of the first comparators 102-1, 102-2, 102-3, and 102-4. In this case, if the voltage applied to the one end (+) is greater than that applied to the other end (−), the output of the first comparator may be "1", and if not, it may be "0". An output signal of the first comparator may vary depending on which one of first to fourth cassettes is mounted. When all cassettes are mounted, all the outputs of the first comparators may be configured to output "1". When some of the cassettes are mounted, only the output of the first comparator corresponding thereto may be configured to output "1" and the other first comparators may be configured to output "0".

The present invention is not limited to whether one end or the other end of the first comparator is connected to a predetermined first voltage or receives a signal applied from the first input unit 103, and thus its opposite case is possible.

Supply voltage may be applied to the first input unit 103 via a first resistor R1 through each of a plurality of cables connected to the connector 101. Additionally, each of a plurality of cables may be connected to the other ends of the plurality of first comparators 102-1, 102-2, 102-3, and 102-4 constituting the first comparing unit 102.

Since a plurality of cassettes may have the same circuit configuration, the first cassette 110 will be mainly used to describe a configuration of a cassette with reference to FIG. 2.

The cassette 110 comprises a second input unit 113 connected to a main board 110 through a connector 111 and a second comparing unit 112 for determining the mounting position of the cassette itself according to a signal applied from the second input unit 113. Although the circuit configuration of the cassette 110 is identical to that of the main board 100, signals applied to the components constituting a circuit, the second input unit 113, and the second comparing unit 112 may be configured to be different.

The second comparing unit 112 of the cassette 110 may comprise a plurality of second comparators 112-1, 112-2, 112-3, and 112-4. A second voltage (b*Vcc) may be applied to the one end (+) of each second comparator. Additionally, a cable connected to the second input unit 113 may be connected to the other end (−) of the second comparator. Likewise, the output signals of the second comparators 112-1, 112-2, 112-3, and 112-4 may vary depending on which one of first to fourth cassettes the cassette itself is mounted on. For example, when the first cassette 110 is mounted on the first connector 111, only the output of the second comparator 112-1 may be "1" and all the outputs of other comparators may be "0". That is, unlike the main board 100, not all the outputs of the second comparators 112-1, 112-2, 112-3, and

112-4 are not “1”. That is, only the output of one second comparator corresponding to the mounting position of the cassette may be “1”.

The second input unit 113 of the cassette 110 may be connected to the main board 100 through the connector 111. The second input unit 113 may be connected to a cable corresponding to the number of connectors through the connector 111, and each cable may be connected to a second resistor R2 for ground. Additionally, cables may be respectively connected to the other ends (−) of the second comparators 112-1, 112-2, 112-3, and 112-4. If signals applied to the other ends (−) of the second comparators 112-1, 112-2, 112-3, and 112-4 is greater than a second voltage applied to the one ends (+), the output of the second comparator may be “2”, and if not, it may be “0”. Additionally, like the main board, the present invention is not limited to whether one ends or the other ends of the second comparators 112-1, 112-2, 112-3, and 112-4 are connected to a predetermined second voltage or receive a signal applied from the second input unit 113. Hereinafter, an operation according to cassette mounting will be described.

For example, when the first cassette 110 is connected to the first connector 111 for mounting, a pin corresponding to the position of the first cassette 110 in the connector 111 is connected to the second input unit 113. In this case, the p terminal of the second input unit 113 conducts current and the current flows into a ground terminal. At this point, a pin corresponding to the position of the first cassette may be connected to the first input unit 103 of the main board 100. Accordingly, the q terminal of the first input unit 103 conducts current and the current flows from a supply voltage terminal. In an ideal case that does not take the resistive components of a connector and a cable into account, a voltage of the p and 1 terminals, for example, a third voltage V3, is expressed by the laws of the voltage distribution as the following Equation 1.

$$V3=Vcc*R2/(R1+R2) \quad \text{Equation 1}$$

At this point, the first voltage (a*Vcc) is applied to the one end (+) of the first comparator 102-1 corresponding to the first cassette and the second voltage V3 is applied to the other end (−) in the main board. The first voltage (a*Vcc) is identically applied to the one ends (+) of the first comparators 102-2, 102-3, and 102-4 corresponding to other cassettes, but supply voltage Vcc is applied to the other ends (−).

For example, in the case that R1=R2 and a=¾, only the output of the first comparator 102-1 corresponding to the first cassette may be “1” so that the mounting of the first cassette may be detected.

Accordingly, according to the mounting positions of a plurality of cassettes, one of supply voltage Vcc or a third voltage V3 may be applied to the other ends of the first comparators, so that mounted cassettes may be identified.

Moreover, the third voltage V3 is applied to the one end (+) of the second comparator 112-1 and the second voltage (b*Vcc) is applied to the other end (−) but the one ends of other second comparators 112-2, 112-3, and 112-4 are grounded in the mounted cassette 110. For example, in the case of a=¾ and b=¼, since ½ Vcc is applied to the one end (+) of the second comparator 112-1 and ¼*Vcc is applied to the other end (−), only the output of the second comparator 112-1 corresponding to the first cassette becomes “1”.

That is, according to the cassette mounting position, one of the third voltage or ground voltage may be connected to the other ends of the second comparators 112-1, 112-2, 112-3, and 112-4.

In FIG. 2, element values such as the first resistor R1, the second resistor R2, the first voltage (a*Vcc), and the second voltage (b*Vcc) may be arbitrarily set, and the present invention is not limited thereto. For example, as a cassette is mounted on a main board, if the output of the first comparator is configured to be “1” and the output of the second comparator is configured to be “1” in the cassette, the first voltage is expressed as the following Equation 2 and the second voltage may be expressed as the third Equation 3.

$$a*Vcc>Vcc*R2/(R1+R2) \quad \text{Equation 2}$$

$$b*Vcc<Vcc*R2/(R1+R2) \quad \text{Equation 3}$$

Additionally, if the output of a comparator, that is, the output of a cassette, is to be configured as “0”, each element value may be set to make the inequalities of Equation 2 and Equation 3 opposite. That is, embodiments of the present invention may vary.

In the above, a cassette detecting device according to an embodiment of the present invention was described. The present invention may be applied to a medium processing device comprising the above-mentioned cassette detecting device for storing or releasing a medium.

As mentioned above, according to the present invention, each cassette itself may determine its mounted position, and also a main board connected to a plurality of cassettes may easily determine the position of the cassette. Additionally, since circuit configurations of a main board and a plurality of cassettes constituting a medium processing device according to the present invention are similar to each other and simple, their manufacturing processes are simple and less expensive.

Even though all the elements of the embodiments are coupled into one or operated in the combined state, the present disclosure is not limited to such an embodiment. That is, all the elements may be selectively combined with each other without departing the scope of the invention.

Additionally, although all components are implemented with separate hardware components, the invention can also be embodied as computer programs having program modules for performing some or all of the functions combined from one or a plurality of hardware in which some or all of the components are selectively combined. Also, functional programs, codes, and code segments for accomplishing the present invention can be easily construed by programmers skilled in the art to which the present invention pertains.) Examples of the computer readable recording medium comprise magnetic storage media (e.g., ROM, floppy disks, hard disks, etc.), optical recording media (e.g., CD-ROMs, or DVDs), and storage media such as carrier waves (e.g., transmission through the Internet).

When it is described that one comprises (or comprises or has) some elements, it should be understood that it may comprise (or include or has) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A cassette detecting device comprising:

a main board comprising a first input unit, detecting whether a plurality of cassettes connected to the first input unit is mounted or detecting mounting positions of the plurality of cassettes, and outputting a result of the detecting; and a plurality of cassettes wherein each of the plurality of cassettes stores a medium, each of the plurality of cassettes comprising a second input unit connected to the main board when each of the plurality of cassettes is mounted on a tray, and each of the plurality of cassettes obtaining a mounting position information according to a signal from the second input unit;

each of the plurality of cassettes and the main board comprises a comparing unit for obtaining the mounting position information of each of the plurality of cassettes;

wherein the main board comprises a first comparing unit for obtaining the mounting position information of each of the plurality of cassettes, wherein the first comparing unit includes a plurality of first comparators corresponding to the plurality of cassettes mounted, respectively; and wherein each of the plurality of cassettes comprises a second comparing unit for obtaining the mounting position information of each of the plurality of cassettes, wherein the second comparing unit includes a plurality of second comparators corresponding to the plurality of cassettes to be mounted, respectively.

2. The cassette detecting device of claim 1, wherein a first voltage is applied to one end of each of the plurality of comparators in the main board;

a second voltage is applied to one end of each of the plurality of comparators in each of the plurality of cassettes; and the first voltage is set to be greater than the second voltage.

3. The cassette detecting device of claim 2, wherein a supply voltage is applied to the first input unit of the main board through a first resistor; and a supply voltage or a third voltage is applied to the other end of each of the plurality of comparator in the main board according to the mounting position of a cassette.

4. The cassette detecting device of claim 3, wherein a second resistor is connected to the second input unit of each of the plurality of cassettes grounded, and according to the mounting position of a corresponding cassette, the third voltage is applied or a ground voltage is connected to the other ends of comparators in each of the plurality of cassettes.

5. The cassette detecting device of claim 4, wherein a second voltage is applied to the one ends of the plurality of comparators in the plurality of cassettes; and when the supply voltage is Vcc, the first resistor is R1, the second resistor is R2, the first voltage is a*Vcc, and the second voltage is b*Vcc, the first voltage and the second voltage are set to be $$a*Vcc>Vcc*R2/(R1+R2) \text{ and } b*Vcc<Vcc*R2/(R1+R2).$$

6. A cassette detecting device comprising:

a main board; and a plurality of cassettes connected to the main board through a connector when each of the plurality of cassettes is mounted on a tray, wherein the main board comprises:

a first input unit connected to the connector; and a first comparing unit including a plurality of first comparators, each of the plurality of first comparators having one end connected to the first input unit and another end connected to a first voltage;

wherein each cassette comprises:

a second input unit connected to the connector; and a second comparing unit including a plurality of second comparators, each of the plurality of second comparators having one end connected to the second input unit and other end connected to a second voltage;

wherein, among the plurality of first comparators, a third voltage is applied to one end of a first comparator corresponding to a position where a cassette is mounted, wherein a supply voltage is applied to the one end of the first comparator corresponding to a position where the cassette is not mounted, and wherein each main board obtains mounting position information of each of the plurality of cassettes by comparing outputs of the plurality of first comparators, and wherein the cassette obtains the mounting position information of each of the plurality of cassettes by comparing outputs of the plurality of second comparators.

7. The cassette detecting device of claim 6, wherein the first voltage is smaller than the supply power and is greater than the third voltage.

8. A medium processing device comprising:

a main board;

a plurality of cassettes connected to the main board when each of the plurality of cassettes is mounted on a tray, each of the plurality of cassettes storing a medium, wherein the main board comprises:

a first input unit; and a first comparing unit connected to the first input unit and comprising a plurality of first comparators corresponding to the plurality of cassettes, respectively;

wherein each of the plurality of cassettes comprises:

a second input unit connected to the first input unit; and a second comparing unit connected to the second input unit and comprising a plurality of second comparators corresponding to the plurality of cassettes, respectively;

wherein each of the plurality of cassettes obtains mounting position information by comparing outputs of the plurality of second comparators, and wherein the main board obtains the mounting position information of each of the plurality of cassette by comparing outputs of the plurality of first comparators.

* * * * *